SECTIONAL ABRASIVE DRUM

Original Filed April 8, 1957 2 Sheets-Sheet 1

RUSSELL W. BERNSTEIN
ALECK BLOCK
INVENTORS.

BY Lyon & Lyon
ATTORNEYS.

SECTIONAL ABRASIVE DRUM

Original Filed April 8, 1957 2 Sheets-Sheet 2

RUSSELL W. BERNSTEIN
ALECK BLOCK
INVENTORS.

BY Lyon & Lyon
ATTORNEYS.

United States Patent Office

Re. 25,025
Reissued Aug. 15, 1961

25,025

SECTIONAL ABRASIVE DRUM

Russell W. Bernstein and Aleck Block, Los Angeles, Calif., assignors to Merit Products, Inc., Culver City, Calif., a corporation of California Original No. 2,821,819, dated Feb. 4, 1958, Ser. No. 651,234, Apr. 8, 1957. Application for reissue Oct. 23, 1959, Ser. No. 848,484
15 Claims. (Cl. 51—193.5)

Matter enclosed in heavy brackets [ ] appears in the original patent but forms no part of this reissue specification; matter printed in italics indicates the additions made by reissue.

This invention relates to sectional abrasive drums, and included in the objects of this invention are:

First, to provide an abrasive drum involving a hub structure arranged to support in radial relation a plurality of abrasive units, each unit including a pack of abrasive-bearing sheets secured to a mounting strip, and wherein means are provided to interlock the mounting strips to the hub structure.

Second, to provide an abrasive drum wherein the hub structure is divided into similar sections which may be mounted on a shaft to form a hub structure of any desired axial length, and the abrasive units are preconstructed to correspond to the various possible lengths of the hub structure.

Third, to provide a sectional abrasive drum which incorporates a novel means for attaching the abrasive units to the hub structure whereby the units may be readily assembled on the drum or removed therefrom, so that abrasive units having different abrasive characteristics may be interchangeably mounted on the hub structure or new abrasive units may be readily and quickly substituted for worn units.

*Fourth, to provide a segmental abrasive unit for mounting in an axial slot in a hub cylinder of an abrasive drum, wherein a plurality of abrasive sheets are secured to an anchor plate or mounting strip under compression such as to reinforce the mounting strip against bending or bowing along its longitudinal axis when in operation in a rotating abrasive drum, the anchor plate being in the form of a strip of tough, fairly rigid sheet material, preferably sheet metal, and the single strip of material constituting the sole anchoring connection between the abrasive segment and the hub.*

With the above and other objects in view, as may appear hereinafter, reference is directed to the accompanying drawings in which.

Figure 1:
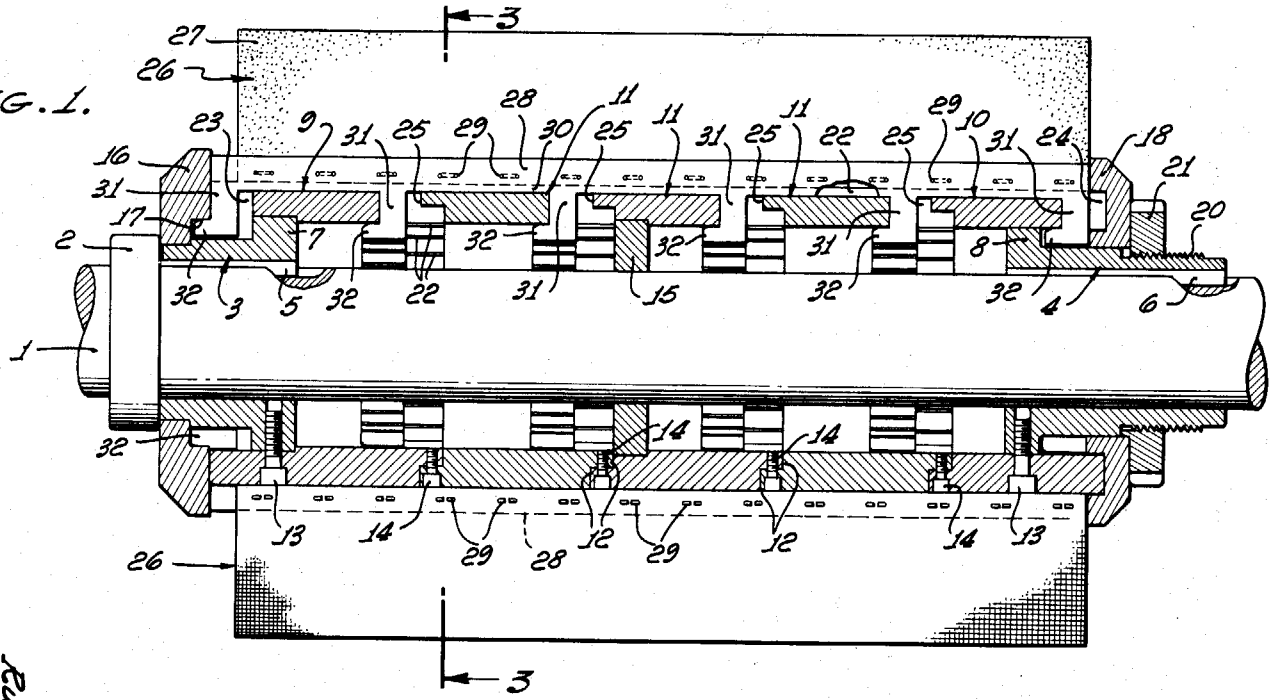
FIGURE 1 is a longitudinal sectional view of the sectional abrasive drum.
Figure 2:
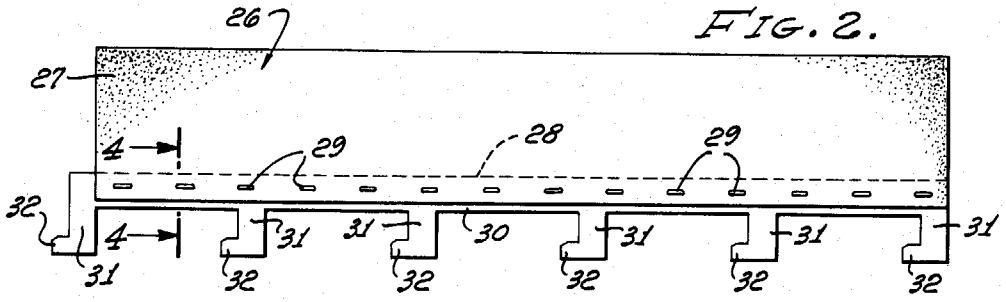
FIG. 2 is a side view of one of the abrasive units.
Figure 3:
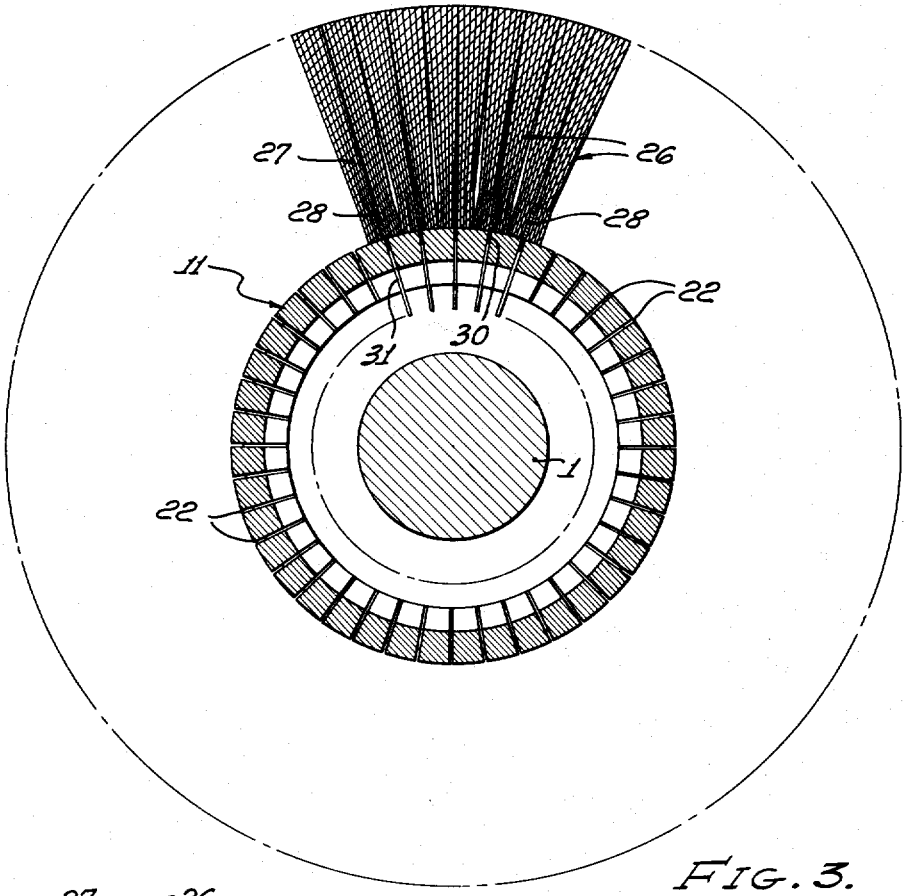
FIG. 3 is an enlarged transverse sectional view through 3—3 of FIG. 1 showing one of the hub sections in end elevation and showing several of the abrasive units in position.

The sectional abrasive drum is mounted on a shaft 1 on which is provided a stop collar 2. Adjacent the stop collar the shaft receives a fixed end sleeve 3. A locking end sleeve 4 is also located on the shaft 1 at a position spaced therefrom representative of the axial length of the sectional abrasive drum. The sleeves are keyed to the shaft 1 by keys 5 and 6.

The confronting ends of the sleeves 3 and 4 are provided with external flanges 7 and 8. The flange 7 of the fixed end sleeve 3 supports a cylindrical fixed end hub section 9. The flange 8 of the locking end sleeve 4 supports a cylindrical locking end hub section 10.

Disposed between the hub sections 9 and 10 is a plurality of intermediate hub sections 11. The number of cylindrical intermediate hub sections depends upon the desired axial length of the completed abrasive drum. The end hub sections 9 and 10 are supported by the sleeves 3 and 4 in concentric relation with the shaft 1. The cylindrical intermediate hub sections 11 are joined to each other and to the end hub sections by mating axially overlapping stepped ends 12. That is, the end of one section is externally reduced and the mating end is internally enlarged so that the ends may be axially telescoped.

The end hub sections 9 and 10 are secured to their respetcive flanges 7 and 8 by means of screws 13. Other screws 14 extend through the axially overlapping ends 12 of the hub sections.

Depending upon the desired axial length of the abrasive drum, one or more centering rings 15 are provided which are disposed between the intermediate hub sections 11 and the shaft 1. Each centering ring 15 may be held in place by providing a slight relief in the corresponding hub section adjacent its end so that the centering ring is retained between an adjacent pair of hub sections.

Mounted on the fixed end sleeve 3, adjacent the collar 2, is a radially extending fixed end flange 16. The end flange 16 is provided with a shoulder 17 having a diameter corresponding to the internal diameter of the hub sections 9, 10, and 11.

The locking end sleeve 4 receives a locking end flange 18 which is slidable thereon and provided with an annular channel proportioned to receive the confronting end of the locking hub section 10. Axially outwardly of the end flange 18 the locking end sleeve 4 is provided with a screw-threaded extension 20 which receives a nut 21 adapted to be tightened against the end flange 18.

Each of the hub sections 9, 10, and 11 is provided with axially directed slots 22 which are equally spaced about the periphery of the hub section. The slots of the hub sections are adapted to be disposed in registry so as to form [a] continuous slots the entire length of the series of the hub sections.

The extremity of the fixed end hub section 9 confronting the flange 16 is provided with radial end slots 23 which intersect the axial slots 22. Similarly, the locking end hub section 10 is provided at its end confronting the flange 18 with radial slots 24 which intersect the axial slots 22. The fixed end hub section 9 and each of the intermediate hub sections 11 are provided at their ends facing toward the locking end flange 18 with intermediate radial slots 25 which also intersect the axial directed slots 22. Thus the hub structure formed by the series of hub sections is provided with continuous longitudinally or axially directed slots intersected at intervals by radially directed slots.

Each longitudinal slot 22 and its intersecting radial slots 23, 24, and 25 serve to secure an abrasive unit 26. Each abrasive unit includes a pack of sheets 27. All of the sheets comprising a pack may be abrasive coated, or lubricating sheets may be interposed. Also the sheets may be initially free of abrasive; for example, cloth sheets may be used, preferably cut on the bias so that neither the warp nor the woof is parallel to the free edges of the sheets. In such case the abrasive, usually rouge or other fine abrasive or polishing material, is applied during the course of use of the drum. In any case the sheets are uniform in width and extend the length of the drum structure formed by the series of drum sections.

Figure 4:
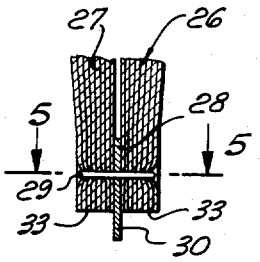
FIG. 4 is an enlarged transverse sectional view through 4—4 of FIG. 2.
Figure 5:
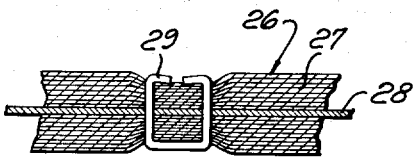
FIG. 5 is a fragmentary sectional view through 5—5 of FIG. 4.

Interleaved in each pack 27 along one margin is a longitudinally extending mounting strip 28 formed of metal. The pack is compressed against the opposite sides of the mounting strip and secured by a series of staples 29, which are driven through the pack 27 and mounting strip 28. Heavy duty staples are employed, capable of piercing the metal plate and maintaining the secured margin of the stack in a compressed condition, as indicated in FIGS. 4 and 5. It should be noted that due to the presence of abrasive, or the textured surface due to the weave of the cloth, the sheets when compressed are caused to interlock or impress into adjacent sheets so that the sheets comprising the pack are thus held with sufficient force that they cannot be stripped from the pack. The mounting strip 28 protrudes from the secured margin of the pack 27 to form an exposed margin 30 adapted to fit in a corresponding axially directed slot 22.

Projecting from the protruding margin of the mounting strip 28 is a plurality of feet 31 proportioned and spaced to be received in the radial slots 23, 24 and 25. Each of the mounting feet 31 terminates in an axially directed lug 32 which is spaced from the adjacent edge of the pack 27 a distance equal to the thickness of the hub sections 9, 10, and 11.

Each abrasive unit 26 may then be mounted by inserting the feet 31 into the slots 23, 24, and 25 until the protruding margin 30 is received in the corresponding slot 22, whereupon the abrasive unit 26 may be slipped axially so that the lugs 32 overlie the adjacent margin of a hub section. At the end of each abrasive unit 26 confronting the fixed end flange 16, the corresponding axial lug 32 fits under the shoulder 17.

The sectional abrasive drum is assembled as follows:

The hub structure comprising the hub section is made up by use of the desired number of intermediate hub sections 11 to form a hub structure of desired length. In this regard it should be noted that the fixed end hub section 9 may be used as a single unit and joined between the flanges 7 and 8 to form a drum of minimum width; or the fixed hub section 9 and locking hub section 10 may be employed with the intermediate hub sections 11 for a drum of increased axial length; still further, any number of intermediate hub sections may be employed within the practical supporting limits of the shaft 1.

After assembly of the hub structure, abrasive units 26 of appropriate length are selected. Initially, the locking end flange 18 and nut 21 are backed off so that the feet 31 may be inserted through the radial slots. Each abrasive unit 26 is inserted radially, then moved axially, so that the lugs 32 interlock with the hub sections. Whereupon the nut 21 is tightened, forcing the fixed end flange 16 against the corresponding ends of the abrasive units 26—or, more particularly, against the corresponding ends of the mounting strips 28—so as to prevent withdrawal of the feet 31.

To change the abrasive units 26, as, for example, to permit the use of abrasive units having different abrasive characteristics, it is merely necessary to loosen the nut 21 and move the end flange 18 to permit withdrawal of the units and replacement with other units. This same procedure is followed in the replacing of worn abrasive units with new abrasive units.

It should be observed that the secured margin of each abrasive pack 27 forms a shoulder 33 extending laterally from each side of the mounting strip 28. Due to the fact that the pack is tightly compressed, the side shoulders 33 constitute a substantial reinforcement of the strip 28. On application of tangential loads, the shoulders seat against the outer surfaces of the hub sections so that they serve to reinforce the mounting strip 28 against bending. Also by reason of the fact that the secured margin of each pack 27 is compressed, the packs tend to be slightly wedge-shaped. Thus, [This] together with the fact that the packs fit snugly, but slidably, between each other, when fitted together on the drum, the packs afford substantial mutual reinforcement against tangential loads.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An abrasive drum, comprising: a hub structure having a plurality of external axially directed slots, and a plurality of radial slots intersecting each axially directed slot; a plurality of abrasive units, each unit including a pack of sheets, a mounting strip, and means securing the pack of sheets to the mounting strip, said mounting strip having a margin adapted to fit an axial slot in said hub structure, and feet elements projecting from said margin to fit the radial slots corresponding to said axial slot, said feet being engageable with said hub structure to restrain said abrasive units against radial displacement.

2. An abrasive drum, comprising: a cylindrical hub structure having external axially directed slots, and radial slots intersecting each axially directed slot at spaced points; a plurality of abrasive units, each abrasive unit including a pack of sheets and a mounting strip, each mounting strip having a margin adapted to fit one of the axial slots and radial feet insertable through the corresponding radial slots, said feet having axially directed restraining elements engageable with the interior of said hub structure adjacent said radial slots to retain the abrasive unit thereon; said radial slots permitting limited axial displacement of each abrasive unit on the drum to permit insertion and removal of said feet; and means for locking said abrasive units against axial displacement.

3. An abrasive drum, comprising: a cylindrical hub structure including a plurality of coaxial hub sections positioned end-to-end, said hub sections having external axially directed slots disposed in axial registry, and radial slots between said hub sections and at the ends of the hub structure in registry with each of said axial slots; a plurality of abrasive units, each unit including a pack of sheets, a mounting strip, and fastening means securing the pack of sheets to the mounting strip, said mounting strip having a margin adapted to fit an axial slot in said hub structure, and feet elements projecting from said margin to fit the radial slots corresponding to said axial slot; and means incorporated in said hub structure and the mounting strips of said abrasive units to restrain said abrasive units against radial displacement.

[4. An abrasive drum, comprising: a cylindrical hub structure including a plurality of coaxial hub sections positioned end-to-end, said hub sections having external axially directed slots disposed in axial registry, and radial slots between said hub sections and at the ends of the hub structure in registry with each of said axial slots; a plurality of abrasive units, each abrasive unit including a pack of sheets and a mounting strip, each mounting strip having a margin adapted to fit one of the axial slots and radial feet insertable through the corresponding radial slots, said feet having axially directed restraining elements engageable with said hub structure adjacent said radial slots to retain the abrasive unit thereon; said radial slots permitting limited axial displacement of each abrasive unit on the drum to permit insertion and removal of said feet; and means for locking said abrasive units against axial displacement.]

[5. An abrasive drum, comprising: a pair of end sleeves adapted to be secured to a shaft in spaced relation; a plurality of tubular hub sections; means for securin gsaid hubs together in end-to-end relation to form a hub structure; means for securing the end hub sections to said end sleeves; said hub structure defining axial slots extending the length thereof and a series of radial slots for each axial slot located between the hub sections and at the ends of the hub structure; a plurality of abrasive units, each unit including a pack of sheets, a mounting strip, and fastening means securing the pack of sheets to the mounting strip, said mounting strip having a margin adapted to fit an axial slot in said hub structure, and feet elements projecting from said margin to fit the radial slots corresponding to said axial slot; and means incorporated in said hub structure and the mounting strips of said abrasive units to restrain said abrasive units against radial displacement.]

[6. An abrasive drum, comprising: a pair of end sleeves adapted to be secured to a shaft in spaced relation; a plurality of tubular hub sections; means securing said hubs together in end-to-end relation to form a hub structure; means for securing the end hub sections to said end sleeves; said hub structure defining axial slots extending the length thereof and a series of radial slots for each axial slot located between the hub sections and at the ends of the hub structure; a plurality of abrasive units, each abrasive unit including a pack of sheets and a mounting strip, each mounting strip having a margin adapted to fit one of the axial slots and radial feet insertable through the corresponding radial slots, said feet having axially directed restraining elements engageable with the interior of said hub structure adjacent said radial slots to retain the abrasive unit thereon; said radial slots permitting limited axial displacement of each abrasive unit on the drum to permit insertion and removal of said feet; and means for locking said abrasive units against axial displacement.]

7. An abrasive drum[,] *as defined in claim 2, said locking means* comprising: [a pair of end sleeves adapted to be secured to a shaft in spaced relation; a plurality of tubular hub sections; means for securing said hubs together in end-to-end relation to form a hub structure; means for securing the end hub sections to said end sleeves; said hub structure defining axial slots extending the length thereof and a series of radial slots for each axial slot located between the hub sections and at the ends of the hub structure; a plurality of abrasive units, each unit including a pack of sheets, a mounting strip, and fastening means securing the pack of sheets to the mounting strip, said mounting strip having a margin adapted to fit an axial slot in said hub structure, and feet elements projecting from said margin to fit the radial slots corresponding to said axial slot; means incorporating said hub structure and the mounting strips of said abrasive units to restrain said abrasive units against radial displacement;] a fixed end flange[;] *and* an axially movable end flange; said flanges engageable with the ends of said mounting strips to secure said abrasive units against axial displacement after insertion of said feet into said radial slots.

8. An abrasive unit for abrasive hub structures having axial slots, each intersected by radial slots and joining internal shoulders at one axial extremity of each radial slot, said abrasive unit comprising: a pack of sheets; a mounting strip extending substantially the length of said pack; fastening means binding said sheets to said mouting strip; each mounting strip having a margin protruding from said pack to fit an axially directed slot in said hub structure, and interlocking feet extending from said margin for insertion through said radial slots.

9. An abrasive unit for abrasive hub structures having axial slots, each intersected by radial slots and joining internal shoulders at one axial extremity of each radial slot, said abrasive unit comprising: a pack of sheets; a mounting strip inserted edgewise into said pack; fastening means extending through said pack and mounting strip to hold said pack compresed against the sides of said mounting strip; a margin of said mounting strip protruding from said pack for insertion in an axial slot of sad hub structure; said pack forming shoulders bordering said protruding margin of the strip to engage said hub structure on opposite sides of said axial slot; and a plurality of feet extending from said mounting strip margin for insertion into said radial slots, each foot terminating in an axially directed interlocking element.

10. An abrasive unit for use in combination with an abrasive drum having *peripherally open* [external] axially directed *circumferentially spaced* [slots, and] radial slots *provided internally with inwardly facing retainer means intermediate the ends thereof* [in registry with each of said axial slots], said abrasive unit comprising: a mounting strip adapted to fit an axially directed slot of said drum and having [a plurality of] anchor *means along its inner* [feet extending from one] margin, *intermediate its ends,* adapted to enter and interlock *with* [within] said *retainer means within the respective slot* [radial slots]; a pack of sheets compressed against said mounting strip; *and* a plurality of fastening elements extending through said pack and said mounting strip to secure said pack to said mounting strip in a compressed condition.

11. An abrasive unit for use in combination with an abrasive drum having *peripherally open* [external] axially directed *circumferentially spaced* [slots, and] radial slots *provided internally with inwardly facing retainer means intermediate the ends thereof* [in registry with each of said axial slots], said abrasive unit comprising: a mounting strip adapted to fit an axially directed slot of said drum and having [a plurality of] mounting *means along its inner* [feet extending from one] margin, *intermediate its ends,* adapted to enter and interlock within said *retainer means within the respective slot* [radial slot]; a pack of sheets compressed against said mounting strip; a plurality of fastening elements extending through said pack and said mounting strip to secure said pack to said mounting strip in a compresser condition; said pack tending to assume a wedge shape and proportioned so that, when a plurality of said packs are assembled on a drum, said packs fit snugly between each other for mutual support; said pack also forming a shoulder along at least one side of said mounting strip for engagement with said drum to reinforce said mounting strip against bending.

*12. A replaceable abrasive unit for a cylindrical hub structure having axial slots and retaining means, comprising: a relatively rigid anchor plate; a stack of relatively flexible abrasive sheets having limited compressibility in a direction transverse to said stack, said stack disposed on at least one side of said anchor plate to form a lateral shoulder; a plurality of clamping and fastening means penetrating said stack and plate and compressing said stack to impart increased rigidity in the region of said shoulder; said unit adapted to be assembled on said hub structure with said anchor plate fitted within a slot thereof so that, said anchor plate will hold said unit against circumferential tilting about an axis parallel to the hub axis, said anchor plate including anchor parts protruding axially for engagement by said retaining means said axially protruding portions being spaced radially inwardly from said root portions of the abrasive sheets and projecting axially in a common direction from axially spaced parts of said one longitudinal marginal portion.*

*13. A replaceable abrasive unit for plural mounting in circumferential array about the periphery of a hub having circumferentially spaced slots disposed in radial-axial planes, and including retaining means at the bottoms of said slots, said unit comprising: an elongated relatively rigid anchor plate having one longitudinal marginal portion receivable in a respective slot in fitted relation therein so as to be supported in a radial plane,*

*a pack of flexible abrasive-coated sheets having limited transverse compressibility disposed on at least one side of said anchor plate with root portions of said sheets in overlapping relation to the opposite longitudinal marginal portion of the plate and with major areas of said sheets extending radially outwardly beyond the outer margin of said anchor plate and freely flexible relative to said plate for operation against a work surface; clamping and fastening means penetrating said root portions and plate and compressing said root portions to impart increased rigidity thereto, whereby when assembled on said hub with said anchor plate received in said slot, said anchor plate is reinforced against outward bending; said one longitudinal marginal portion of said anchor plate projecting radially inwardly from said pack and along its inner margin intermediate its ends having projecting fastener means engageable with said retaining means for anchoring said unit against radially outward displacement from said hub; said root portions collectively constituting a substantially rigid butt section providing, at the inner margin of said pack, a shoulder extending transversely from a face of said anchor plate, said pack being of substantially rectangular cross section in a plane normal to said anchor plate face when its component leaves are in face-to-face contact, whereby a plurality of said abrasive units may be assembled in annular array about said hub with said annular plates mounted in respective hub slots, with said shoulders disposed externally of the hub, with said butt sections arranged in circumferential adjacency to one another in an annular array about said periphery, and with the outward portions of said abrasive-coated sheets extending radially outwardly with increasing circumferential spacing toward their outward extremities so as to provide maximum circumferential flexibility in the working tips thereof.*

*14. A rotary abrasive drum comprising; a plurality of replaceable abrasive units, discardible as a whole when used, and a hub structure including a hub cylinder having circumferentially spaced slots disposed in radial-axial planes, and having axially spaced, opposed retaining means, said units each comprising: an elongated relatively rigid anchor plate; a pack of flexible abrasive sheets having limited transverse compressibility disposed on at least one side of said anchor plate with root portions of such sheets in overlapping relation thereto along the length thereof and with outward portions of said sheets projecting radially outwardly beyond said anchor plate and freely flexible relative thereto for abrasive operation on a work surface; means anchoring said root portions to said anchor plate in compressed condition and thereby rigidified so as to reinforce said abrasive pack against outward bowing along the length of said root portions; said anchor plate providing, along the length of said root portions, a relatively rigid mounting means having, along the inner margin thereof and intermediate its ends, projecting means engageable with said retaining means and being adapted to be snugly seated in a respective slot of said hub cylinder and to be thereby supported so as to retain such pack in its respective radial-axial plane while securing said pack against radially outward escape from said hub cylinder when rotated against a work surface.*

*15. A replaceable abrasive unit for attachment in multiple annular array to a hub having axially extending circumferentially spaced mounting slots and retaining means in the bottoms of said slots, comprising: an anchor plate of rigid material having an inner longitudinal marginal portion thereof adapted to be mounted in one of said slots in fitted relation thereto so as to be held in a radial plane, and anchored therein by said retaining means; a pack of flexible abrasive coated sheets having limited transverse compressibility, having root portions disposed partially in overlapping relation to said anchor plate on at least one side thereof and having substantially uniform aggregate thickness throughout their radial dimension, thereby providing work-engaging portions projecting radially outwardly from said anchor plate and freely flexible relative to the anchor plate when rotated against a work surface; a plurality of clamping and fastening means penetrating said pack and plate and securing said sheets to said plate under compression to impart increased rigidity to said unit in the region of said root portions whereby when assembled on said drum with said anchor plate within a slot thereof, said anchor plate is reinforced against bending transversely of an axis parallel to said hub axis while being held by said anchor plate against tilting circumferentially, said longitudinal marginal portion of anchor plate protruding radially inwardly from said pack for reception in said slot and having, along the inner longitudinal margin thereof, anchor means for engagement by said retaining means whereby to provide centrifugal load-resisting support for said anchor plate at multiple positions distributed along the length thereof.*

*16. An abrasive drum comprising: a hub having axially extending circumferentially spaced mounting slots and retaining means in the bottoms of said slots and an annular array of replaceable abrasive units each comprising an anchor plate of rigid material having an inner longitudinal marginal portion thereof mounted in one of said slots in fitted relation thereto and thereby held in a radial plane, and anchored therein by said retaining means; a pack of flexible abrasive coated sheets having limited transverse compressibility, having root portions disposed partially in overlapping relation to said anchor plate on at least one side thereof and having substantially uniform aggregate thickness throughout their radial dimension, thereby providing work-engaging portions projecting radially outwardly from said anchor plate and freely flexible relative to the anchor plate when rotated against a work surface; a plurality of clamping and fastening means penetrating said pack and plate and securing said sheets to said plate under compression to impart increased rigidity to said unit in the region of said root portions whereby said anchor plate is reinforced against bending transversely of an axis parallel to said hub axis while being held by said anchor plate against tilting circumferentially, said longitudinal marginal portion of anchor plate protruding radially inwardly from said pack into said slot and having, along the inner longitudinal margin thereof, anchor means engaged by said retaining means whereby to provide centrifugal load-resisting support for said anchor plate at multiple positions distributed along the length thereof.*

*17. In combination: a hub having circumferentially spaced axially directed peripheral slots extending radially inwardly and having internal inwardly facing retainer means; and a plurality of abrasive units each comprising a pack of abrasive-coated flexible sheets and a rigid mounting plate having an outer portion in overlapping relation to inward portions of said sheets, said inward portions being secured to one another and to said mounting plate in a rigid butt section from which flexible portions of said sheets project outwardly, said mounting plate having an inner longitudinally extending portion projecting radially inwardly from said butt section and received in a respective hub slot and provided with anchor means along its inward longitudinal margin, engaged with said retainer means in said hub slot at multiple points distributed intermediate the ends thereof, to anchor the abrasive unit to the hub in a manner to secure the anchor plate against outward bowing under centrifugal loading.*

*18. An abrasive unit for attachment to a hub having circumferentially spaced axially directed peripheral slots extending radially inwardly and having internal inwardly facing retainer means; said abrasive unit comprising a pack of abrasive-coated flexible sheets and a rigid mounting plate having an outer portion in overlapping relation to inward portions of said sheets, said inward portions being secured to one another and to said mounting plate in a rigid butt section from which flexible portions of*

*said sheets project outwardly, said mounting plate having an inner longitudinally extending portion projecting radially inwardly from said butt section and receivable in a respective hub slot and provided with anchor means along its inward longitudinal margin, engageable with said retainer means in said hub slot at multiple points distributed intermediate the ends thereof to anchor the*

*abrasive unit to the hub in a manner to secure the anchor plate against outward bowing under centrifugal loading.*

References Cited in the file of this patent
or in the original patent

UNITED STATES PATENTS 596,014 Condon et al. ---------- Dec. 21, 1897